(12) United States Patent
Inoue et al.

(10) Patent No.: US 7,274,172 B2
(45) Date of Patent: Sep. 25, 2007

(54) DRIVE STATE DETECTION CIRCUIT

(75) Inventors: Fumihiro Inoue, Tama (JP); Kouji Edamura, Tama (JP); Naoto Endo, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 424 days.

(21) Appl. No.: 11/069,205

(22) Filed: Feb. 28, 2005

(65) Prior Publication Data
US 2006/0038538 A1    Feb. 23, 2006

(30) Foreign Application Priority Data
Aug. 23, 2004 (JP) .............................. 2004-242470

(51) Int. Cl.
*H02J 7/04* (2006.01)
*G09G 3/36* (2006.01)

(52) U.S. Cl. ...................... 320/157; 345/102

(58) Field of Classification Search .......... 315/209 PZ, 315/307, 318, 319; 310/316.01, 317, 318–319; 345/87, 98, 102; 320/148, 149, 152, 157, 320/159
See application file for complete search history.

(56) References Cited

U.S. PATENT DOCUMENTS 5,982,110 A * 11/1999 Gradzki ...................... 315/247
6,198,198 B1 * 3/2001 Fujimura et al. ...... 310/316.01
6,407,480 B1 * 6/2002 Nakanishi et al. ..... 310/316.01
6,566,821 B2 * 5/2003 Nakatsuka et al. ... 315/209 PZ
2003/0209680 A1 * 11/2003 Burkatovsky .......... 250/559.36

FOREIGN PATENT DOCUMENTS

JP      06-267674      9/1994
JP      2002-134293    5/2002

* cited by examiner

*Primary Examiner*—Shih-Chao Chen
*Assistant Examiner*—Minh Dieu A
(74) *Attorney, Agent, or Firm*—Ladas & Parry LLP (57) ABSTRACT

A drive state detection circuit is disclosed that detects a drive state of plural parts driven by alternating currents. The drive state detection circuit comprises current detecting parts to detect alternating current detection signals of the respective alternating currents flowing through the driven parts, a maximum value output part to output an alternating current detection signal having a maximum value among the alternating current detection signals detected by the current detecting parts, a coefficient multiplication part to multiply the signal output from the maximum value output part by a coefficient, a comparing part to compare the multiplied signal with the alternating current detection signals so as to output state signals corresponding to the respective driven parts, a logic synthesizing part to generate an output by logically synthesizing the state signals output from the comparing part, and an output part to generate a drive state detection signal based on the output from the logic synthesizing part.

6 Claims, 8 Drawing Sheets

DRIVE STATE DETECTION CIRCUIT

BACKGROUND OF THE INVENTION

1. Field of the Invention

The present invention relates to a drive state detection circuit, and particularly relates to a drive state detection circuit that detects a drive state of parts driven by alternating currents.

2. Description of the Related Art

CCFLs (Cold Cathode Fluorescent Lamps) are used as, for example, back lights of liquid crystal display monitors. The CCFLs are driven by a drive system with an alternating current. The drive system is equipped with a protection system that detects a drive state of the CCFLs to protect the CCFLs.

The protection system usually detects the drive state of CCFLs by outputting maximum values of the voltage and current supplied to the CCFLs. For outputting maximum values, a protection system disclosed, for example, in Japanese Patent Laid-Open publication No. 6-267674 and No. 2002-134293, holds AC signals of the voltage and current supplied to CCFLs at their peaks, and converts them into DC signals.

State detection circuits for CCFLs with the above type of protection systems therefore need to have additional circuits such as peak hold circuits, which make the configuration complicated.

SUMMARY OF THE INVENTION

A general object of the present invention is to provide a drive state detection circuit to overcome at least one disadvantage described above. A specific object of the present invention is to provide a simply-configured drive state detection circuit capable of detecting a drive state of driven parts without having additional circuits.

According to an aspect of the present invention, there is provided a drive state detection circuit to detect a drive state of plural parts driven by alternating currents, comprising current detecting parts to detect alternating current detection signals of the respective alternating currents flowing through the driven parts, a maximum value output part to output an alternating current detection signal having a maximum value among the alternating current detection signals detected by the current detecting parts, a coefficient multiplication part to multiply the signal output from the maximum value output part by a coefficient, a comparing part to compare the multiplied signal with the alternating current detection signals so as to output state signals corresponding to the respective driven parts, a logic synthesizing part to generate an output by logically synthesizing the state signals output from the comparing part, and an output part to generate a drive state detection signal based on the output from the logic synthesizing part.

It is preferable that the drive state detection circuit further comprise a reference voltage generating part to generate a reference voltage corresponding to a lower limit of a maximum value, and a second comparing part to compare the signal output from the maximum value output part with the reference voltage generated by the reference voltage generating part and output a state signal based on a comparison result to the logic synthesizing part.

It is also preferable that the drive state detection circuit further comprise a voltage detecting part to detect voltages applied to the driven parts, a second reference voltage generating part to generate a reference voltage corresponding to an upper limit of a voltage applied to the driven parts, and a third comparing part to compare the voltages detected by the voltage detecting parts with the reference voltage generated by the second reference voltage generating part so as to output a state signal based on a comparison result to the logic synthesizing part.

It is also preferable that the output part be adapted to invert the drive state detection signal when the output from the logic synthesizing part stays in a predetermined condition during a predetermined time.

It is also preferable that the output part comprise a capacitor, a charging part to charge the capacitor, a discharging part to discharge the capacitor according to the output of the logic synthesizing part, and an output circuit to invert the drive state detection signal according to a charging voltage of the capacitor.

It is also preferable that the plural driven parts be Cold Cathode Fluorescent Lamps.

According to the present invention, the highest level signal among input signals can be selectively output by utilizing switching characteristics of plural input transistors, a current mirror circuit, and an output transistor.

DETAILED DESCRIPTION OF THE PREFERRED EMBODIMENT

This embodiment describes a case where a maximum value output circuit is used in a CCFL (Cold Cathode Fluorescent Lamp) lighting system. Firstly, the CCFL lighting system is described below.

[System Configuration]

Figure 1:
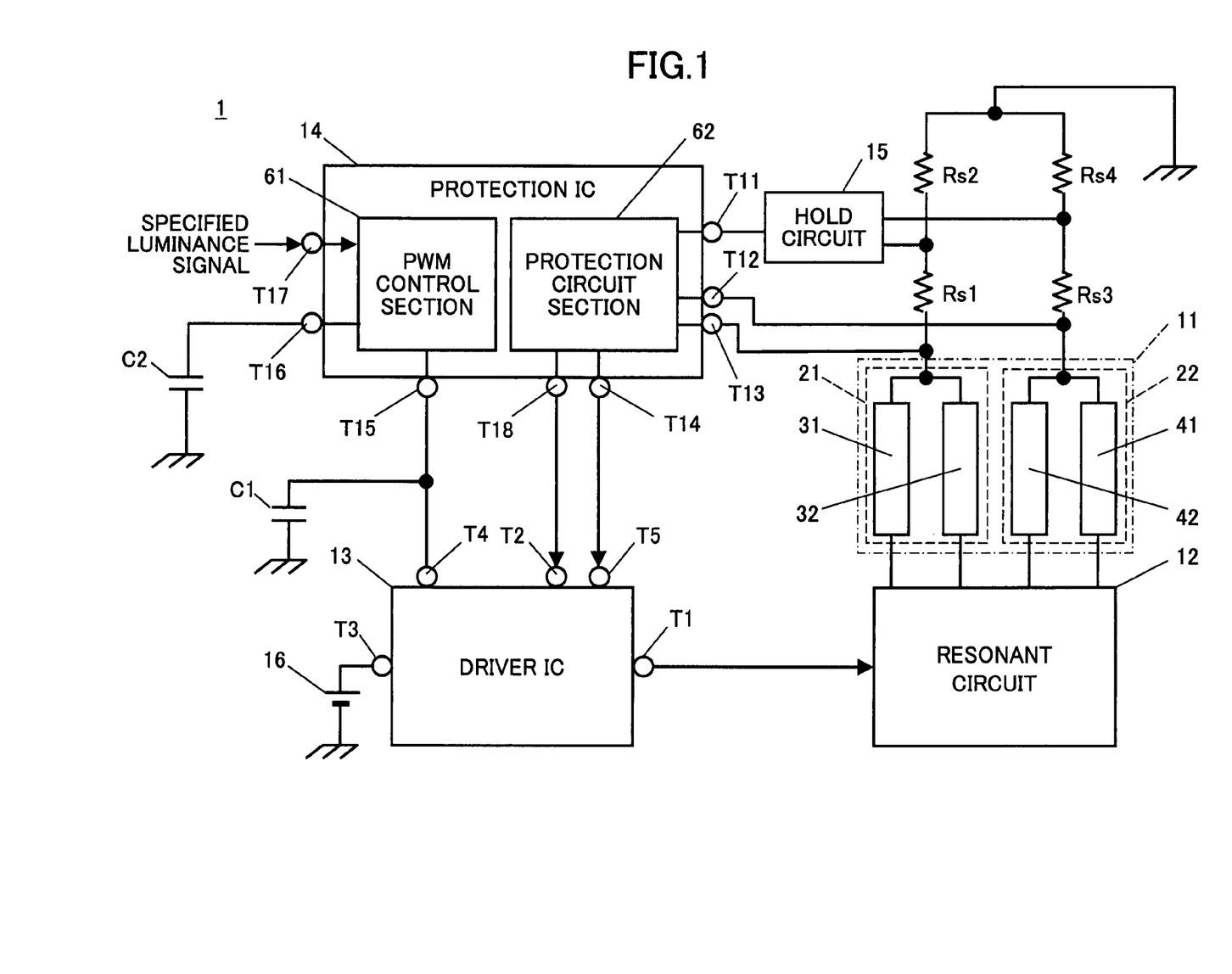
FIG. 1 is a circuit diagram of a CCFL lighting system according to an embodiment of the present invention.

FIG. 1 is a circuit diagram of a CCFL lighting system 1 according to this embodiment of the present invention.

The CCFL lighting system 1 of this embodiment is used as, for example, a back light system of a liquid crystal display monitor, comprising a CCFL section 11, a resonant circuit 12, a driver IC (Integrated Circuit) 13, a protection IC (Integrated Circuit) 14, a peak hold circuit 15, a reference voltage generator 16, and capacitors C1 and C2.

The CCFL section 11 comprises paired CCFLs 21 and 22 arranged in parallel. The paired CCFL 21 includes two CCFLs 31 and 32 arranged in parallel. The paired CCFL 22 also includes two CCFLs 41 and 42 arranged in parallel.

An end of each of the CCFLs 31, 32, 41 and 42 is connected to the resonant circuit 12. The other end of each of the CCFLs 31 and 32 is grounded through detection resistances Rs1 and Rs2. The other end of each of the CCFLs 41 and 42 is also grounded through detection resistances Rs3 and Rs4.

When a voltage with a predetermined frequency (e.g. 50 kHz) is applied to each end of the CCFLs 31, 32, 41 and 42, drive currents flow therethrough and the CCFLs 31, 32, 41 and 42 are turned on. When a voltage with a frequency higher (e.g. 100 kHz) or lower than the predetermined frequency is applied, the CCFLs 31, 32, 41 and 42 are turned off.

The resonant circuit 12 receives a drive signal with a predetermined frequency from the driver IC 13. The resonant circuit 12 includes a capacitor and a transformer (not shown). With the capacitance and inductance thereof, the resonant circuit 12 resonates with the drive signal from the driver IC 13, and provides drive power to the CCFL section 11.

[Driver IC 13]

Figure 2:
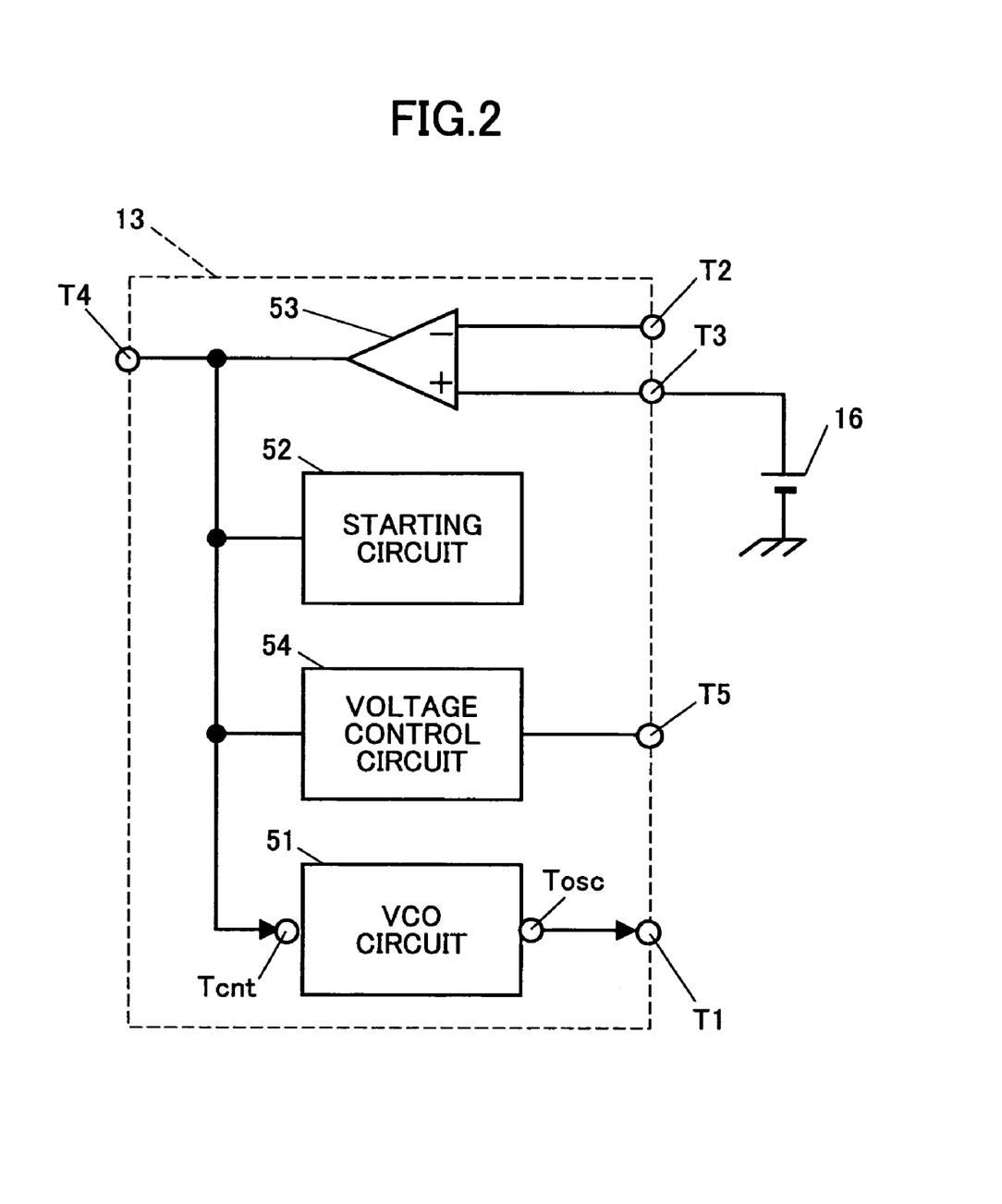
FIG. 2 is a circuit diagram of a driver IC.

FIG. 2 is a circuit diagram of the driver IC 13.

The driver IC 13 comprises a VCO (Voltage Control Oscillator) circuit 51, a starting circuit 52, an error amplifier 53 and a voltage control circuit 54.

A control terminal Tcnt of the VCO circuit 51 is connected to the starting circuit 52, the error amplifier 53, the voltage control circuit 54 and a terminal T4. The VCO circuit 51 outputs oscillation with a frequency corresponding to the voltage applied to the control terminal Tcnt from an output terminal Tosc.

The output terminal Tosc of the VCO circuit 51 is connected to an output terminal T1 of the driver IC 13. The oscillation of the VCO circuit 51 is output from the output terminal T1 to the resonant circuit 12.

The starting circuit 52 controls the control voltage of the VCO circuit 51 so as to quickly turn on the CCFLs 31, 32, 41 and 42 at the time of, for example, power-on.

The error amplifier 53 has an inverting input terminal connected to a terminal T2 and a non-inverting input terminal connected to a terminal T3. The terminal T2 receives an average value signal from the protection IC 14, while the terminal T3 receives a reference voltage from a reference voltage generator. The error amplifier 53 outputs a voltage corresponding to a difference between the average value signal and the reference voltage. The output of the error amplifier 53 is sent to the control terminal Tcnt of the VCO circuit 51 and the terminal T4.

The voltage control circuit 54 is connected to a terminal T5. The terminal T5 is connected to a terminal T14 of the protection IC 14, from which a stop signal is provided. The voltage control circuit 54 keeps the control terminal Tcnt of the VCO circuit 51 at a high level according to the stop signal from the protection IC 14. Once the voltage control circuit 54 keeps its output high level, the output remains high level until it is reset by a power-off.

The terminal T4 is connected to a terminal T15 of the protection IC 14 and an end of the capacitor C1. The control voltage applied to the control terminal Tcnt is controlled by a charging voltage of the capacitor C1, so that the oscillation frequency of the VCO circuit 51 is controlled.

[Protection IC 14]

Referring to FIG. 1, the protection IC 14 comprises a PWM (Pulse Width Modulation) control section 61 and a protection circuit section 62. The PWM control section 61 performs PWM control on the oscillation state of the VCO circuit 51 of the driver IC 13 according to the luminance of the CCFLs 31, 32, 41 and 42.

[PWM Control Section 61]

Figure 3:
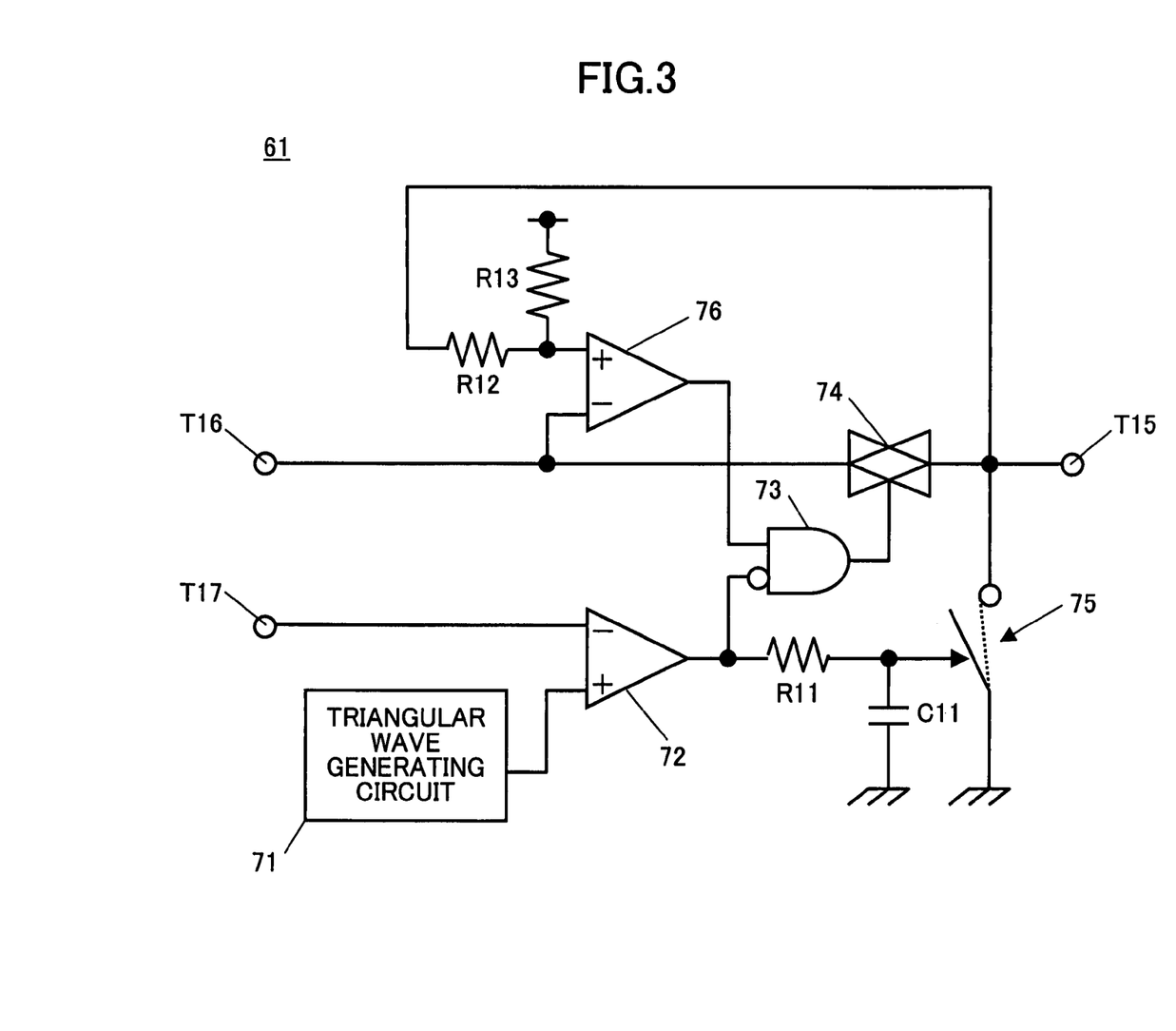
FIG. 3 is a circuit diagram of a PWM control section.

FIG. 3 is a circuit diagram of the PWM control section 61.

The PWM control section 61 comprises a triangular wave generating circuit 71, a comparator 72, a gate circuit 73, analog switch 74, a discharge switch 75, a comparator 76, resistances R11, R12 and R13, and a capacitor C11.

A terminal T17 receives a specified luminance signal for determining a luminance from an external unit. The specified luminance signal received by the terminal T17 is provided to an inverting input terminal of the comparator 72. A non-inverting input terminal of the comparator 72 receives a triangular wave from the triangular wave generating circuit 71. The comparator 72 compares the luminance signal with the triangular wave. If the triangular wave is higher than the luminance signal, the output of the comparator 72 becomes high level. If the triangular wave is lower than the luminance signal, the output becomes low level. The comparator 72 thus generates a pulse corresponding to the frequency of the triangular wave and having a pulse width corresponding to the luminance signal.

The output pulse of the comparator 72 is provided to the switch 75 through a delay circuit including the resistance R11 and the capacitor C11, and also provided to the gate circuit 73. The switch 75, which is arranged between the terminal T15 and the ground, is turned on/off with a pulse delayed from the output pulse of the comparator 72 by a time determined by the resistance R11 and the capacitor C11. When the pulse is low level, the switch 75 is switched off and charges the capacitor. When the pulse is high level, the switch 75 is switched on and discharges the capacitor C1.

The gate circuit 73 inverts the output pulse of the comparator 72 to input therein. The gate circuit 73 also receives the output of the comparator 76. The gate circuit 73 outputs a logical AND of the inverted output of the comparator 72 with the output of the comparator 76. The output of the gate circuit 73 is provided to the analog switch 74.

The analog switch 74, which is arranged between the terminals T15 and T16, is turned on/off according to the output of the gate circuit 73. When the output of the gate circuit 73 is high level, the analog switch 74 is turned on to short-circuit the terminals T15 and T16. When the output of the gate circuit 73 is low level, the analog switch 74 is turned off to open-circuit the terminals T15 and T16.

An inverting input terminal of the comparator 76 is connected to the terminal T16, while a non-inverting input terminal of the comparator 76 is connected to a connection point between the resistances R12 and R13. An end of the resistance R12 is connected to the non-inverting input terminal of the comparator 76, while the other end is connected to the terminal T15. An end of the resistance R13 is connected to a connection point between the non-inverting input terminal of the comparator 76 and the end of the resistance R12, while the other end of the resistance R13 receives a supply voltage Vdd.

The comparator 76 compares a potential of the connection point between the resistances R12 and R13 with a potential of the terminal T16. If the potential of the connection point between the resistances R12 and R13 is higher than the potential of the terminal T16, the output becomes high level. If the potential of the connection point between the resistances R12 and R13 is lower than the potential of the terminal T16, the output becomes low level.

The following describes the operations of the PWM control section 61.

First, when the output pulse of the comparator 72 becomes high level, the switch 74 is turned off to open-circuit the terminals T15 and T16. The capacitor C1 is therefore electrically disconnected from the capacitor C2.

Then, the switch 75 becomes high level with a delay caused by the resistance R11 and capacitor C11. The switch 75 is therefore turned on shortly after the output of the comparator 72 becomes high level. As the switch 75 is turned on, the capacitor C1 connected to the terminal T15 is discharged.

When the capacitor C1 is discharged, the potential of the terminal T15 is lowered. Then, the triangular wave output from the triangular wave generating circuit 71 is lowered. The output of the comparator 72 therefore becomes low level, and the switch 75 is turned off with a little delay caused by the resistance R11 and the capacitor C11. As the switch 75 is turned off, the capacitor C1 is charged by the potential of the terminal T4 of the driver IC 13.

When the capacitor C1 is charged, the potential of the terminal T15 is raised. As the potential of the terminal T15 is raised, the potential of the non-inverting input terminal of the comparator 76 is raised.

When the potential of the non-inverting input terminal of the comparator 76 exceeds the potential of the terminal T16, i.e., the charging voltage of the capacitor C2, the output of the comparator 76 becomes high level. Then, the output of the gate circuit 73 becomes high level, and the analog switch 74 is turned on. As the switch 74 is turned on, the capacitor C1 is electrically connected to the capacitor C2. The terminal T4 is therefore electrically connected to the capacitors C1 and C2.

As such, when the charging voltage of the capacitor C1 reaches a desired voltage with respect to the charge voltage of the capacitor C2, the analog switch 74 is turned on to electrically connect the terminal T4 to the capacitors C1 and C2. This can prevent an overshoot of the capacitor C1 during charging.

When the triangular wave of the triangular wave generating circuit 71 becomes higher than the specified luminance signal, the output of the comparator 72 becomes high level. Then, the output of the gate circuit 73 becomes low level, and the analog switch 74 is turned off. As the analog switch 74 is turned off, the capacitor C2 retains the potential of the terminal T4 of the driver IC 13. Shortly after the analog switch 74 is turned off, the switch 75 is turned on to discharge the capacitor C1. Since the analog switch 74 is already turned off, the capacitor C2 keeps retaining the potential of the terminal T4.

With these operations, the potential of the terminal T4 of the driver IC 13 is controlled so as to vary forming pulses according to the output pulse of the comparator 72.

Since the potential of the terminal T4 varies forming pulses, the driver IC 13 can change the oscillation frequency of the VCO circuit 51 so that the frequency is switched between approximately 50 kHz and approximately 100 kHz. When the output oscillation frequency of the VCO circuit 51 becomes 50 kHz, the resonant circuit 12 resonates therewith to turn on the CCFLs 31, 32, 41 and 42. When the output oscillation frequency of the VCO circuit 51 becomes 100 kHz, the power supply from the resonant circuit 12 to the CCFLs 31, 32, 41 and 42 is stopped and the CCFLs 31, 32, 41 and 42 are turned off.

In this way, the power is intermittently supplied to the CCFLs 31, 32, 41 and 42, so that the luminance is kept constant.

The overshoot of the potential of the terminal T4 can be prevented by controlling the connection of the capacitors C1 and C2 and changing the capacity thereof by means of the analog switch 74 during the charging of the capacitor C1. Accordingly, the oscillation output of the VCO circuit 51, of which oscillation frequency is controlled by the potential of the terminal T4, can be stabilized.

[Protection Circuit Section 62]

The following describes the protection circuit section 62, which characterizes the present invention.

The protection circuit 62 is configured to detect a maximum value of a voltage and current supplied to the CCFL section 11, and detect malfunction of the CCFL section 11.

Figure 4:
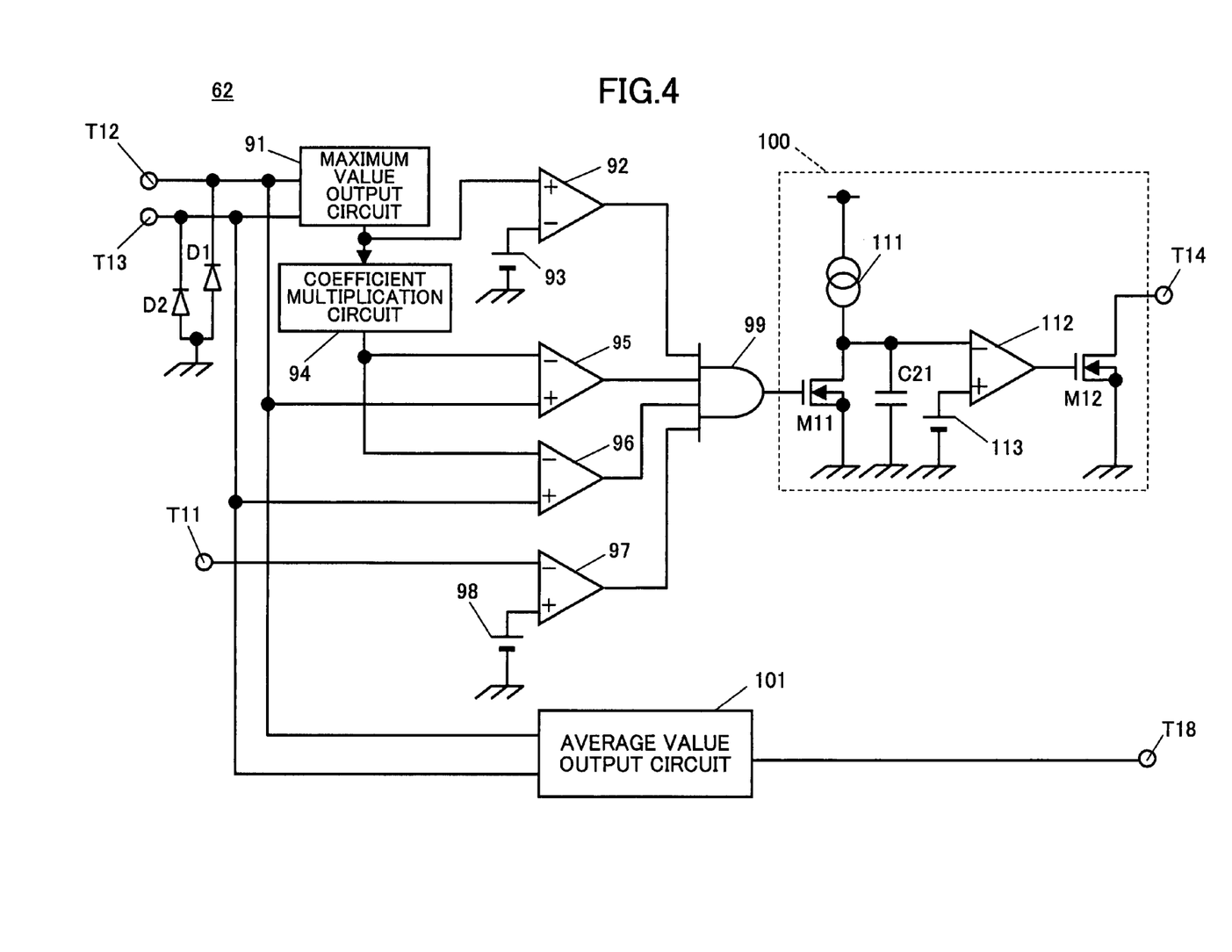
FIG. 4 is a circuit diagram of a protection circuit section.

FIG. 4 is a circuit diagram of the protection circuit section 62.

The protection circuit 62 comprises a maximum value output circuit 91, a comparator 92, a reference voltage generator 93, a coefficient multiplication circuit 94, comparators 95, 96 and 97, a reference voltage generator 98, an AND gate 99, an output circuit 100, and diodes D1 and D2.

The maximum value output circuit 91 receives detection voltages through terminals T12 and T13. The terminal T12 is grounded through the diode D1 connected in an opposite direction. The terminal T13 is grounded through the diode D2 connected in an opposite direction.

The diodes D1 and D2 function as protection elements for the protection IC 14. The diodes D1 and D2 perform half-wave rectification of the detection voltages from the terminals T12 and T13. The detection voltages are then provided to the maximum value output circuit 91.

The maximum value output circuit 91 selectively outputs a higher one of the detection voltages provided from the terminals T12 and T13.

The maximum value signal output from the maximum value output circuit 91 is provided to a non-inverting input terminal of the comparator 92 and the coefficient multiplication circuit 94. An inverting input terminal of the comparator 92 receives a reference voltage from the reference voltage generator 93. The reference voltage generated by the reference voltage generator 93 is set to a lower limit value of the maximum value signal.

If the maximum value signal from the maximum value output circuit 91 is greater than the reference voltage generated by the reference voltage generator 93, the output of the comparator 92 becomes high level. If the maximum value signal is smaller than the reference voltage generated by the reference voltage generator 93, the output of the comparator 92 becomes low level. The output of the comparator 92 is provided to the AND gate 99.

Meanwhile, the coefficient multiplication circuit 94 multiplies the maximum value signal by 0.8. In other words, the coefficient multiplication circuit 94 outputs a signal equivalent to 80 percent of the maximum value. The signal multiplied by 0.8 by the coefficient multiplication circuit 94 is provided to inverting input terminals of the comparators 95 and 96.

A non-inverting input terminal of the comparator 95 is provided with a detection signal V12 from the terminal T12. If the detection signal V12 is greater than the signal equivalent to 80 percent of the maximum value from the coefficient multiplication circuit 94, the output of the comparator 95 becomes high level. If the detection signal V12 is smaller, the output of the comparator 95 becomes low level.

A non-inverting input terminal of the comparator 96 is provided with a detection signal V13 from the terminal T13. If the detection signal V13 is greater than the signal equivalent to 80 percent of the maximum value from the coefficient multiplication circuit 94, the output of the comparator 96 becomes high level. If detection signal V13 is smaller, the output of the comparator 96 becomes low level. The outputs of the comparators 95 and 96 are provided to the AND gate 99.

An inverting input terminal of the comparator 97 is provided with an output of the hold circuit 15 through a terminal T11. The hold circuit 15 holds the maximum voltage of a connection point between detection resistances Rs1 and Rs2 and a connection point between detection resistances Rs3 and Rs4. A non-inverting input terminal of the comparator 97 receives a reference voltage from the reference voltage generator 98. The reference voltage generated by the reference voltage generator 98 is set to a voltage corresponding to a maximum drive voltage.

If the output voltage of the hold circuit 15 is higher than the reference voltage from the reference voltage generator 98, the output of the comparator 97 becomes low level. If the output voltage of the hold circuit 15 is lower than the reference voltage from the reference voltage generator 98, the output of the comparator 97 becomes high level. The output of the comparator 97 is provided to the AND gate 99.

The AND gate 99 is provided with the outputs of the comparators 92, 95, 96 and 97. The AND gate 99 outputs a logical AND of the outputs of the comparators 92, 95, 96 and 97. If all of the outputs of the comparators 92, 95, 96 and 97 are high level, the output of the AND gate 99 becomes high level. If any of the outputs of the comparators 92, 95, 96 and 97 is low level, the output of the AND gate 99 becomes low level. The output of the AND gate 99 is provided to the output circuit 100.

The output circuit 100 comprises a current source 111, a comparator 112, a reference voltage generator 113, a capacitor C21, and transistors M11 and M12.

The output of the AND gate 99 is provided to a gate of the transistor M11. The transistor M11 is an N-channel MOS field-effect transistor, having a grounded source. The capacitor C21 is connected to the transistor M11 in parallel with the drain-source thereof. The current source 111 supplies a charging current to a connection point between the drain of the transistor M11 and the capacitor C21.

The transistor M11 is turned on when the output of the AND gate 99 is high level, and is turned off when the output of the AND gate is low level. When the transistor M11 is turned off, the capacitor C21 is charged with the charging current from the current source 111. When the transistor M11 is turned on, the charge in the capacitor C21 is released to the ground through the transistor M11. In this way, the capacitor c21 is charged or discharged according to the on/off state of the transistor M11.

The charging voltage of the capacitor C21 is applied to an inverting input terminal of the comparator 112. A non-inverting input terminal of the comparator 112 receives a reference voltage from the reference voltage generator 113. If the charging voltage of the capacitor C21 is higher than the reference voltage from the reference voltage generator 113, the output of the comparator 112 becomes low level. If the charging voltage of the capacitor C21 is lower than the reference voltage from the reference voltage generator 113, the output of the comparator 112 becomes high level. The output of the comparator 112 is provided to a gate of the transistor M12.

The transistor M12 is an N-channel MOS field-effect transistor, having a source connected to the ground and a drain connected to the terminal T14. The transistor M12 is turned on when the output of the comparator 112 is high level, and is turned off when the output is low level.

[Operations of Protection Circuit]

Figure 5:
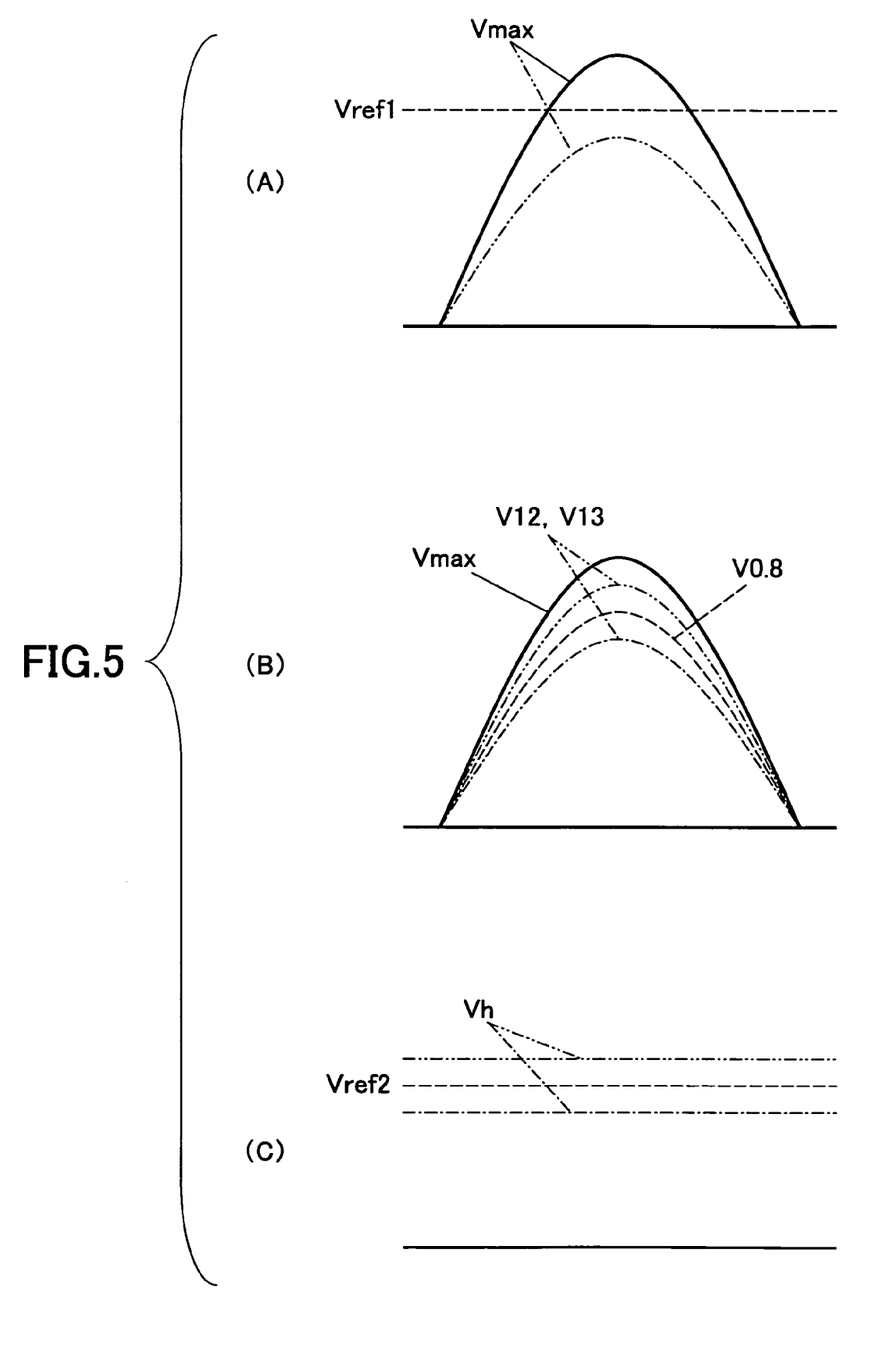
FIG. 5 is an operations chart of the protection circuit section.
Figure 6:
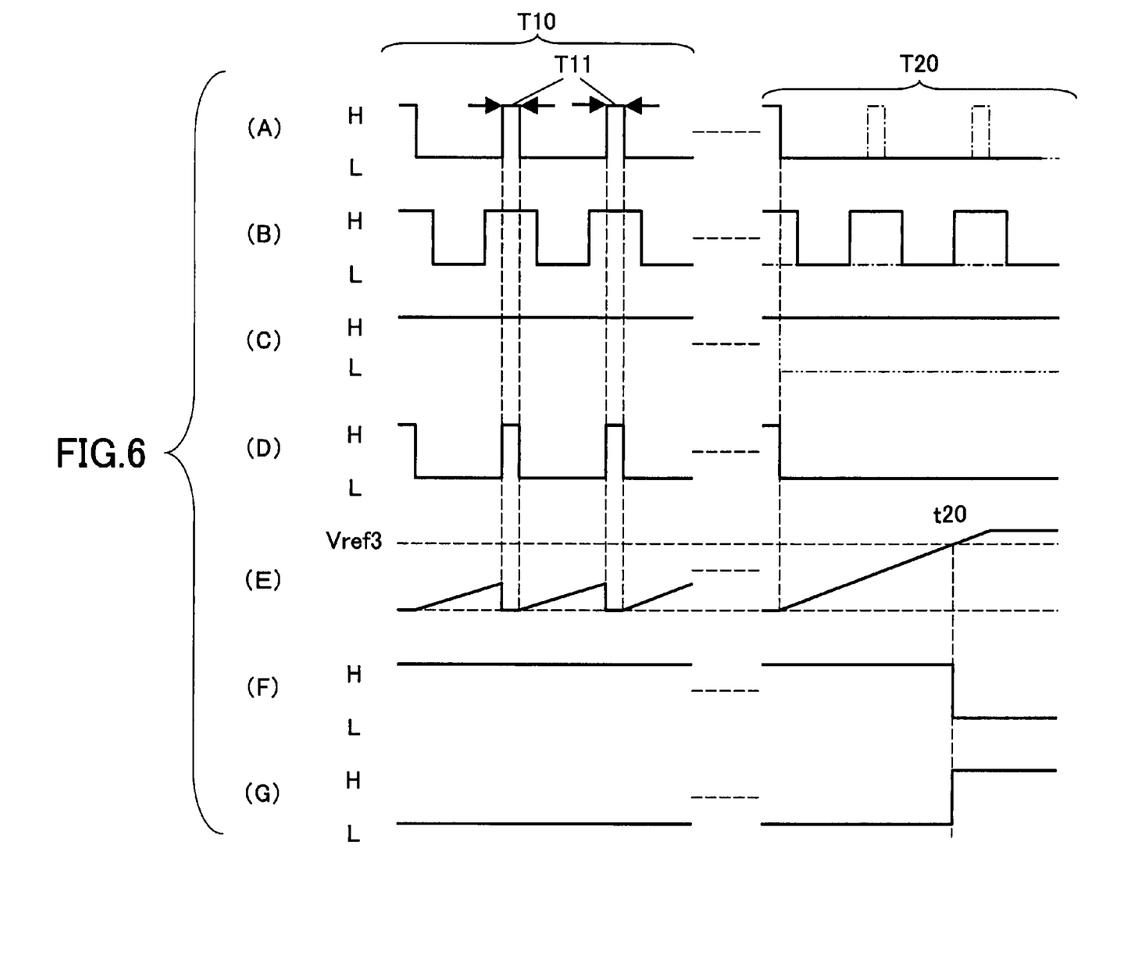
FIG. 6 is another operations chart of the protection circuit section.

FIGS. 5 and 6 are operations diagrams of the protection circuit section 62. In FIG. 5, (A) shows operations of the comparator 92; (B) shows operations of the comparators 95 and 96; and (C) shows operations of the comparator 97. In FIG. 6, (A) shows the output of the comparator 92; (B) shows the output of the comparator 95 or 96; (C) shows the output of the comparator 97; (D) shows the output of the AND gate 99; (E) shows the charging voltage of the capacitor C21; (F) shows the output of the comparator 112; and (G) shows the output of the terminal T14. A period T10 in FIG. 6 shows a normal operation state during normal operations, and a period T20 shows a state when malfunction is detected.

[Normal Operation State]

Referring to (A) in FIG. 5, in a normal operation state, as shown an output voltage Vmax (continuous line) of the maximum value output circuit 91 exceeds a reference voltage Vref1 generated by the reference voltage generator 93. Therefore, the output of the comparator 92 becomes high level. Since the output of the comparator 92 is high level only when the output of the maximum value output circuit 91 is higher than the reference voltage Vref generated by the reference voltage generator 93, the pulse shows an intermittent waveform as shown in (A) in FIG. 6.

Referring to (B) in FIG. 5, the comparators 95 and 96 compare a voltage V0.8 (dashed line) of 80 percent of the output voltage Vmax of the maximum value output circuit 91 with output voltages V12 and V13 of the terminal T12 and T13, and output the comparison result. In the normal state, the output voltages V12 and V13 (chain double-dashed line) of the terminals T12 and T13 are higher than the voltage V0.8. The output voltages V12 and V13 of the terminals T12 and T13 and the voltage V0.8 show a half-wave rectification waveform, where an unstable period appears in approximately during a half of each cycle. If the output during the unstable period is recognized as low level, the pulse shows an intermittent waveform as shown in (B) in FIG. 6.

Referring to (C) in FIG. 5, the comparator 97 compares a DC voltage Vh from the hold circuit 15 with a reference voltage Vref2 generated by the reference voltage generator 98. In the normal operation state, the voltage Vh (chain dashed line) is lower than the reference voltage Vref2. Therefore, the output of the comparator 97 is high level.

As can be seen, in the normal operation state, during the period T11 ((A) in FIG. 6) in which the output of the comparator 92 is high level, all of the outputs of the comparators 92, 95, 96 and 97 are high level ((A), (B), (C) in FIG. 6) The output of the AND gate 99 is therefore high level during the period T11 as shown in (D) in FIG. 6.

When the output of the AND gate 99 becomes high level in the period T11, the transistor M11 is turned on to discharge the charging voltage of the capacitor C21 as shown in (E) in FIG. 6. In the period except the period T11, the output of the AND gate 99 becomes low level, so that the transistor M11 is turned off to permit the current source 111 to charge the capacitor C21. Therefore, charging is performed in the intervals between the periods T11 as shown in (E) in FIG. 6.

The charging voltage of the capacitor C21 does not reach the reference voltage generated by the reference voltage generator 113, because the period T11 appears each cycle of the output voltages of the terminals T12 and T13. As the charging voltage of the capacitor C21 stays lower than the reference voltage Vref3, the output of the comparator 112 stays high level as shown in (F) in FIG. 6. The terminal T14 therefore stays low level as shown in (G) in FIG. 6.

[State When Malfunction is Detected]

If the output of the maximum value output circuit 91 falls below the reference voltage, i.e., the lower limit value of the maximum value signal, the output of the comparator 92 becomes low level.

Referring to FIG. 6, in a period T20, when the output of the comparator 92 becomes low level as shown in (D), the output (continuous line) of the AND gate 99 becomes low level. While the output of the AND gate 99 stays low level and therefore the transistor M11 is kept at the off state, the capacitor C21 is charged by the current source 111 as shown in (E). When the charging voltage of the capacitor C21 reaches the reference voltage Vref3 at a time t20, the output of the comparator 112 becomes low level as shown in (F) and the terminal T14 becomes high level as shown in (G).

If the voltage of the terminal T12 or T13 falls below the output of the coefficient multiplication circuit 94, i.e., 80 percent of the maximum value signal due to malfunction related to the connection or light-out of the CCFL section 11, the output of the comparator 95 or 96 (chain dashed line in (B)) stays low level during T20.

When the output of the comparator 92 becomes low level, the output of the AND gate 99 (continuous line in (D)) becomes low level in the period T20. While the output of the AND gate 99 stays low level and therefore the transistor M11 is kept at the off state, the capacitor C21 is charged by the current source 111 as shown in (E). When the charging voltage of the capacitor C21 reaches the reference voltage Vref3 at the time t20, the output of the comparator 112 becomes low level as shown in (F) and the terminal T14 becomes high level as shown in (G).

If a voltage is excessively applied to the CCFL section 11 and the voltage of the terminal T11 exceeds the reference voltage generated by the reference voltage generator 98, the output of the comparator 97 (chain double-dashed line in (C)) becomes low level. When the output of the comparator 97 becomes low level, the output of the AND gate 99 (continuous line in (D)) becomes low level in the period T20. While the output of the AND gate 99 stays low level and therefore the transistor M11 is kept at the off state, the capacitor C21 is charged by the current source 111 as shown in (E). When the charging voltage of the capacitor C21 reaches the reference voltage Vref3 at the time t20, the output of the comparator 112 becomes low level as shown in (F) and the terminal T14 becomes high level as shown in (G).

When the terminal T14 becomes high level, the malfunction is detected by the driver IC 13, which has the terminal T5 connected to the terminal T14. When the terminal T5 becomes high level, the voltage control circuit 54 stops the oscillation output of the VCO circuit 51.

An average value circuit 101 is provided with the detection signals V12 and V13 from the terminals T12 and T13. The average value circuit 101 generates a signal corresponding to the detection signals V12 and V13 and outputs the signal from the terminal T18. The terminal T18 is connected to the terminal T2 of the driver IC 13.

[Maximum Value Output Circuit 91]

The following describes the maximum value output circuit 91.

Figure 7:
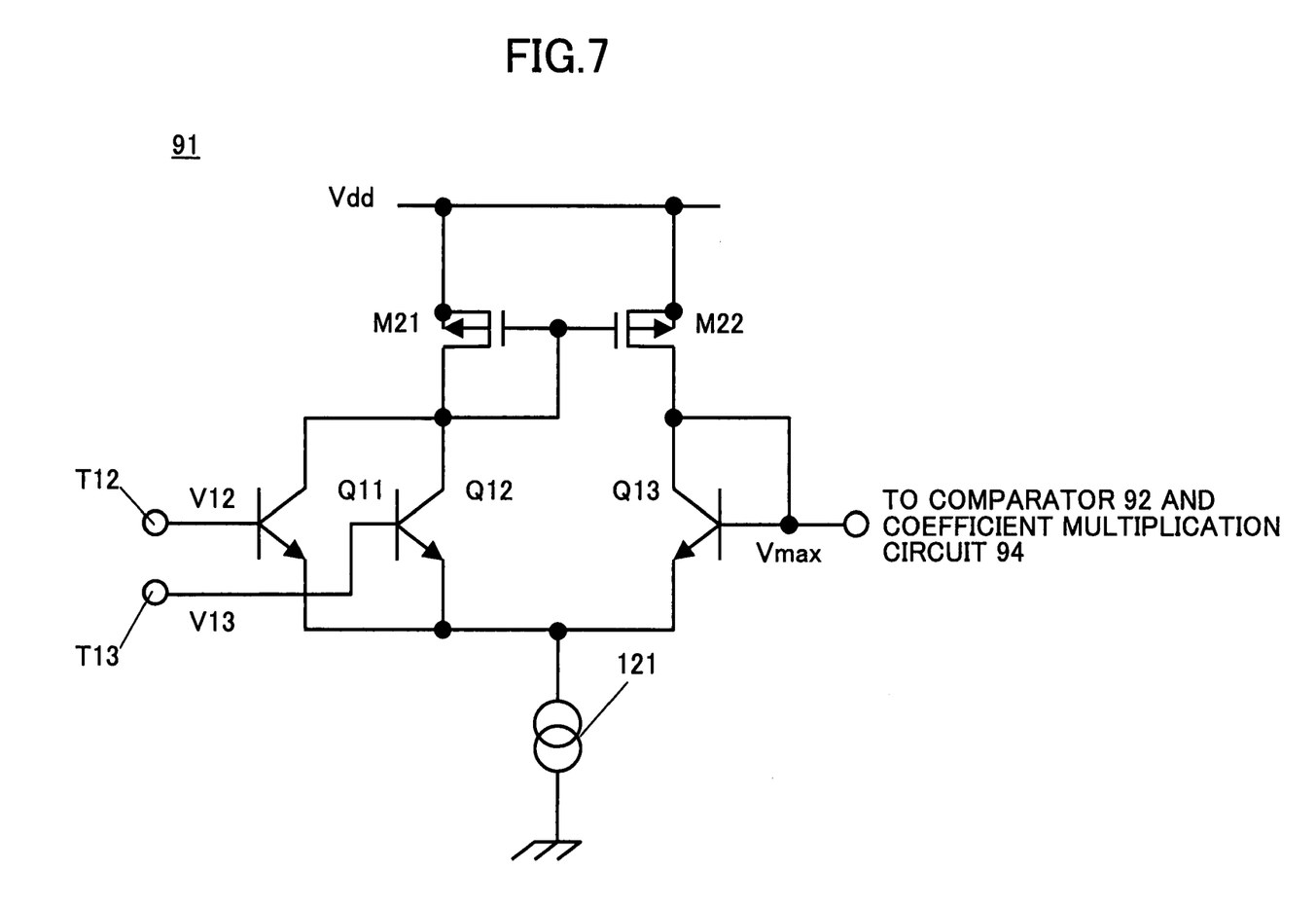
FIG. 7 is a circuit diagram of a maximum value output circuit.

FIG. 7 is a circuit diagram of the maximum value output circuit 91.

The maximum value output circuit 91 selectively outputs the maximum level signal among the detection signals provided from the terminals T12 or T13, comprising bipolar transistors Q11, Q12 and Q13, MOS field-effect transistors M21 and M22, and a current source 121.

The bipolar transistors Q11, Q12 and Q13 are NPN transistors. The transistors Q11 and Q12 have substantially the same characteristics.

The transistor Q11, serving as an input transistor, has a base connected to the terminal T12, a collector connected to a drain and gate of the transistor M21 and to a gate of the transistor M22, and an emitter grounded through the current source 121. The transistor Q11 introduces a current corresponding to the detection signal of the terminal T12 from the collector.

The transistor Q12, also serving as an input transistor, has a base connected to the terminal T13, a collector connected to the drain and gate of the transistor M21 and to the gate of the transistor M22. The transistor Q12 introduces a current corresponding to the detection signal of the terminal T13 from the collector.

The transistor Q13, serving as an output transistor, has a collector connected to a drain of the transistor M22, and an emitter grounded through the current source 121. The current flowing through the transistor Q13 corresponds to the current flowing through the transistor Q11 or Q12.

The transistors M21 and M22 are P-channel MOS field-effect transistors. The transistor M21 has a source to which the supply voltage Vdd is applied, and a gate connected to a drain thereof and the gate of the transistor M22. The transistor M22 has a source to which the supply voltage Vdd is applied, and a gate connected to the gate and drain of the transistor M21. The transistors M21 and M22 form a current mirror circuit so that a current corresponding to the current introduced from the collector of the transistor Q11 or Q12 is output from the drain of the transistor M22. The drain of the transistor M22 is connected to the collector and base of the output transistor Q13.

The emitter of the transistor Q13 is grounded through the current source 121. The drain of the transistor M22 and a connection point between the collector and base of the transistor Q13 are maximum value outputs. The output of the maximum value output circuit 91 is provided to the comparator 92 and the coefficient multiplication circuit 94.

Figure 8:
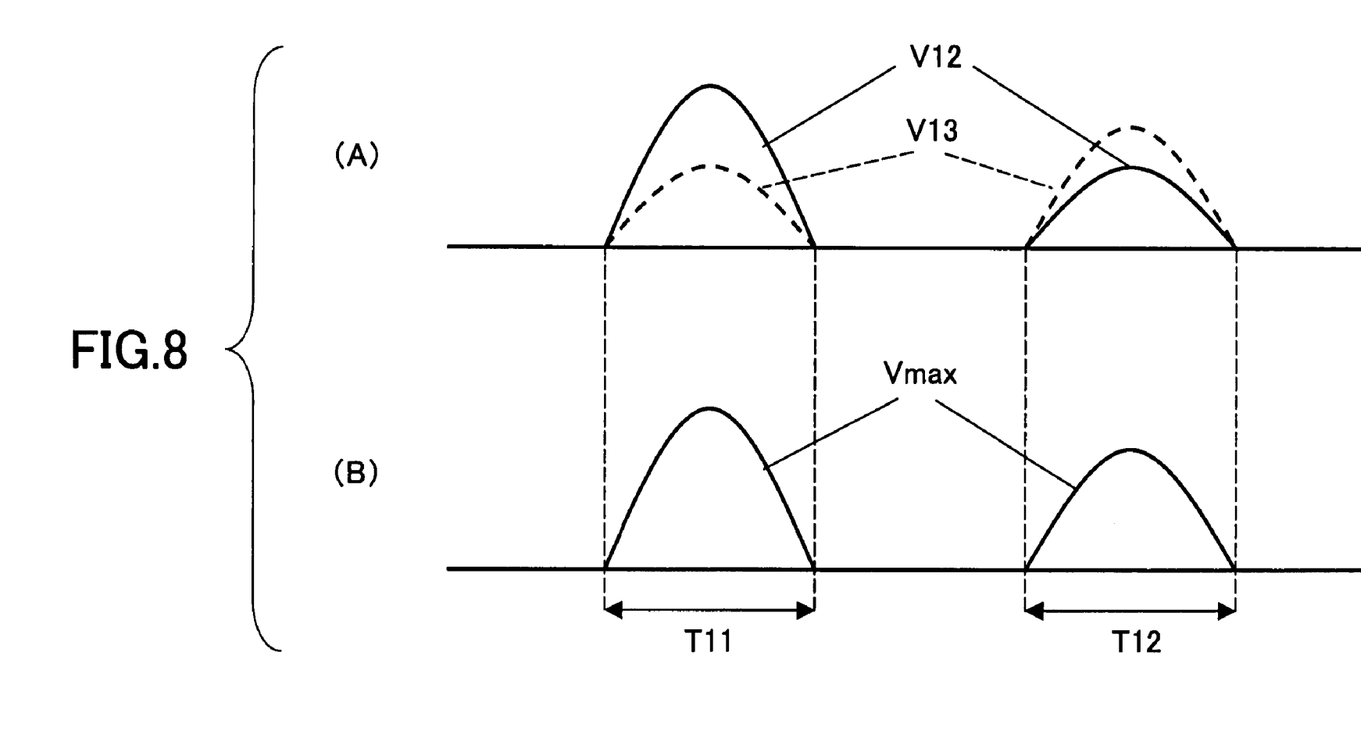
FIG. 8 is an operations chart of the maximum value output circuit.

FIG. 8 is an operations chart of the maximum value output circuit 91. In FIG. 8, (A) shows an input signal, and (B) shows an output signal.

As shown in a period T11 in (A), when the detection signal V12 from the terminal T12 is higher than the detection signal V13 from the terminal T13, the collector current of the transistor Q11 is well over the collector current of the transistor Q12 due to the characteristics of the collector current with respect to the base-emitter voltage of the bipolar transistor. Namely, the current output capacity of the transistor Q11 increases well over the current output capacity of the transistor Q12.

The transistors Q11 and Q12 are configured to provide a current to the same source, i.e., the current source 121. Therefore, when the current output capacity of the transistor Q11 is well over the current output capacity of the transistor Q12, most of the current provided to the current source 121 is from the transistor Q11.

As a current mirror circuit is formed by the transistors M11 and M12, a current same as the current of the transistor Q11 flows through the collector of the transistor Q13. Accordingly, a signal same as the signal appearing at the base of the transistor Q11 appears at the base of the transistor Q13 as shown in (B).

On the other hand, as shown in the period T12 in (A), when the detection signal V13 from the terminal T13 is higher than the detection signal V12 from the terminal T12, the collector current of the transistor Q12 is well over the collector current of the transistor Q11 due to the characteristics of the collector current with respect to the base-emitter voltage of the bipolar transistor. Namely, the current output capacity of the transistor Q12 increases well over the current output capacity of the transistor Q11.

The transistors Q11 and Q12 are configured to provide a current to the same source, i.e., the current source 121. Therefore, when the current output capacity of the transistor Q12 is well over the current output capacity of the transistor Q11, most of the current provided to the current source 121 is from the transistor Q12.

As a current mirror circuit is formed by the transistors M11 and M12, a current same as the collector current of the transistor Q12 flows through the transistor Q13. Accordingly, a signal same as the signal appearing at the base of the transistor Q12 appears at the base of the transistor Q13 as shown in (B).

With this configuration, the maximum value output circuit 91 can output higher one of the input signals V12 and V13. In addition, since bipolar transistors are used as the input/output transistors Q11, Q12 and Q13 in this embodiment, the difference between the current supply capacities of the transistors Q11 and Q12 based on the detection signals V12 and V13 is increased. Therefore, the maximum value output circuit 91 can accurately output a maximum value.

It should be understood, although a circuit for detecting a state of that CCFLs is exemplified in the above embodiment, the drive state detection circuit of the present invention is not limited thereto. The drive state detection circuit of the present invention is a circuit that detects a state of parts driven by alternating currents, and is applicable to other devices without being limited to the above specific examples.

The present application is based on Japanese Priority Application No. 2004-242470 filed on Aug. 23, 2004, with the Japanese Patent Office, the entire contents of which are hereby incorporated by reference.

What is claimed is:

1. A drive state detection circuit to detect a drive state of a plurality of parts driven by alternating currents, comprising:
   current detecting part to detect alternating current detection signals of the respective alternating currents flowing through the driven parts;
   a maximum value output part to output an alternating current detection signal having a maximum value among the alternating current detection signals detected by the current detecting parts;
   a coefficient multiplication part to multiply the signal output from the maximum value output part by a coefficient;
   a comparing part to compare the multiplied signal with the alternating current detection signals so as to output state signals corresponding to the respective driven parts;
   a logic synthesizing part to generate an output by logically synthesizing the state signals output from the comparing part; and
   an output part to generate a drive state detection signal based on the output from the logic synthesizing part.

2. The drive state detection circuit as claimed in claim 1, further comprising:
   a reference voltage generating part to generate a reference voltage corresponding to a lower limit of a maximum value; and
   a second comparing part to compare the signal output from the maximum value output part with the reference voltage generated by the reference voltage generating part, and output a state signal based on a comparison result to the logic synthesizing part.

3. The drive state detection circuit as claimed in claim 1, further comprising:
   a voltage detecting part to detect voltages applied to the driven parts;
   a second reference voltage generating part to generate a reference voltage corresponding to an upper limit of a voltage applied to the driven parts; and
   a third comparing part to compare the voltages detected by the voltage detecting parts with the reference voltage generated by the second reference voltage generating part, and output a state signal based on a comparison result to the logic synthesizing part.

4. The drive state detection circuit as claimed in claim 1, wherein the output part is adapted to invert the drive state detection signal when the output from the logic synthesizing part stays in a predetermined condition during a predetermined time.

5. The drive state detection circuit as claimed in claim 4, wherein the output part comprises:
   a capacitor;
   a charging part to charge the capacitor;
   a discharging part to discharge the capacitor according to the output of the logic synthesizing part; and
   an output circuit to invert the drive state detection signal according to a charging voltage of the capacitor.

6. The drive state detection circuit as claimed in claim 1, wherein the plurality of driven parts are Cold Cathode Fluorescent Lamps.

* * * * *